B. R. EATON.
Churn.
No. 62,121. Patented Feb. 19, 1867.
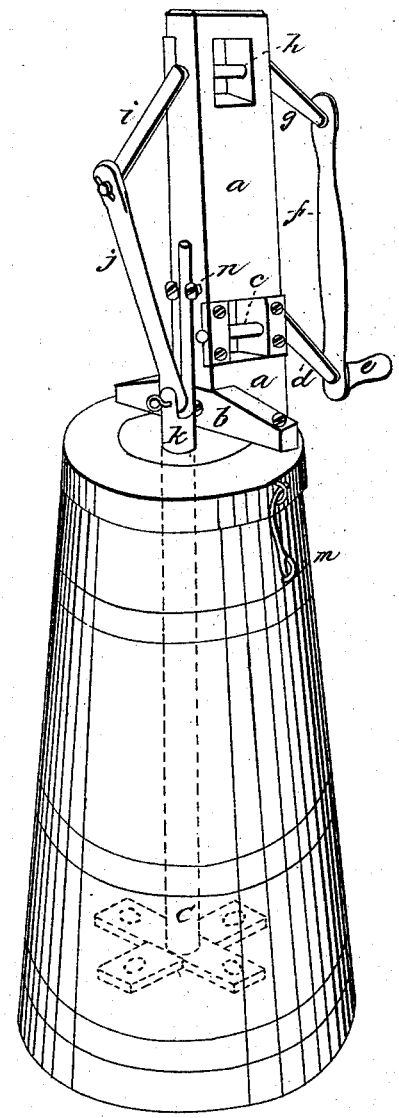
Witnesses:
J. C. Button
Parker Adams
Inventor:
Belden R. Eaton

United States Patent Office.

BELDEN R. EATON, OF CLIFTON, WISCONSIN.

Letters Patent No. 62,121, dated February 19, 1867.

---

IMPROVEMENT IN CHURNS.

---

The Schedule referred to in these Letters Patent and making part of the same.

---

TO ALL WHOM IT MAY CONCERN:

Be it known that I, BELDEN R. EATON, of the town of Clifton, in the county of Pierce, in the State of Wisconsin, have invented a new and useful Improvement in Churns; and I do hereby declare that the following is a full, clear, and exact description of the construction and operation of the same, reference being had to the annexed drawings, making a part of this specification.

$a\ a$ is a wooden post or frame, about three times as thick at the bottom as it is at the top, firmly attached to sill $b$; and $c$ is a short shaft, firmly fastened to post $a\ a$ by cleats screwed thereon; $d$ is a crank, with a handle, $e$; and $f$ is a pitman, with each end working on a wrist; $g$ and $i$ are cranks or levers, solid and without joints, at either end of shaft $h$, and stand nearly opposite to each other; and the shaft $h$ is fastened to post $a\ a$ in the same manner as that of shaft $c$, only on the opposite side thereof. $j$ is another pitman, attached to a wrist at each end, the lower end fastened by a pin in a slit in the handle of the dasher $k$; and $l$, the upper end of the handle, being held between two nuts $n$; and $m$ is a latch, holding the cover on the churn, one on each side.

What I claim, and desire to secure by Letters Patent, is—

The combination of the two levers $g$ and $i$, so constructed and arranged on the shaft $h$, that two motions or strokes are produced upon the dash $k$ and $l$, at one revolution of the handle $e$, all of which will more fully appear, and as shown in the drawing aforesaid.

BELDEN R. EATON.

Witnesses:
   J. C. BUTTON,
   PARKER ADAMS.